(12) United States Patent
Parron et al.

(10) Patent No.: US 10,681,108 B2
(45) Date of Patent: Jun. 9, 2020

(54) APPARATUS ADAPTED FOR MAINTAINING RECEIVING DATA QUALITY AND METHOD FOR RECEIVING DATA

(71) Applicant: Intel IP Corporation, Santa Clara, CA (US)

(72) Inventors: Jerome Parron, Fuerth (DE); Martin Kugler, Poing (DE)

(73) Assignee: Apple Inc., Cupertino, CA (US)

( * ) Notice: Subject to any disclaimer, the term of this patent is extended or adjusted under 35 U.S.C. 154(b) by 259 days.

(21) Appl. No.: 15/607,556

(22) Filed: May 29, 2017

(65) Prior Publication Data

US 2018/0007113 A1     Jan. 4, 2018

(30) Foreign Application Priority Data

Jun. 30, 2016 (EP) .................................... 16177155

(51) Int. Cl.

| | |
|---|---|
| G06F 15/16 | (2006.01) |
| H04L 29/06 | (2006.01) |
| H04N 21/647 | (2011.01) |
| H04N 21/4425 | (2011.01) |
| H04N 21/434 | (2011.01) |
| H04L 12/853 | (2013.01) |
| H04L 12/801 | (2013.01) |
| H04W 28/04 | (2009.01) |

(52) U.S. Cl.
CPC .......... *H04L 65/80* (2013.01); *H04L 47/2416* (2013.01); *H04L 47/34* (2013.01); *H04L 65/608* (2013.01); *H04L 69/22* (2013.01); *H04N 21/434* (2013.01); *H04N 21/4425* (2013.01); *H04N 21/6473* (2013.01); *H04W 28/04* (2013.01)

(58) Field of Classification Search
CPC ...... G06F 11/07; H04L 47/2416; H04L 47/34; H04L 65/608; H04L 65/80; H04L 69/22; H04N 21/434; H04N 21/4425; H04N 21/6473; H04W 28/04
USPC .......................................................... 709/247
See application file for complete search history.

(56) References Cited

U.S. PATENT DOCUMENTS 6,608,841 B1 * 8/2003 Koodli ................... H04L 29/06
                                                          341/60
6,680,921 B1 * 1/2004 Svanbro .................. H03M 7/30
                                                          370/324

(Continued)

OTHER PUBLICATIONS

The extended European search report based on Application No. 16177155.5(6 Pages) dated Jan. 13, 2017 (Reference Purpose Only).

(Continued)

*Primary Examiner* — Phuoc H Nguyen
(74) *Attorney, Agent, or Firm* — Kowert, Hood, Munyon, Rankin & Goetzel, P.C.

(57) ABSTRACT

A communication device is described comprising a media output unit, a receiver configured to receive a packet of a sequence of packets, the packet comprising a compressed header and media payload and a processor configured to detect whether decompression of the compressed header is prevented, and, if decompression of the compressed header is prevented, to determine a sequence number of the media payload, extract the media payload from the packet and forward the media payload and an indication of the sequence number to the media output unit.

20 Claims, 15 Drawing Sheets

(56) References Cited

U.S. PATENT DOCUMENTS

| | | | | |
|---|---|---|---|---|
| 6,751,209 | B1* | 6/2004 | Hamiti | H04L 29/06 |
| | | | | 370/349 |
| 6,999,429 | B1* | 2/2006 | Hannu | H04L 69/04 |
| | | | | 370/328 |
| 7,836,124 | B2* | 11/2010 | Saxena | H04L 29/06 |
| | | | | 709/204 |
| 2002/0141365 | A1* | 10/2002 | Leung | H04L 12/189 |
| | | | | 370/335 |
| 2004/0088642 | A1 | 5/2004 | Imura et al. | |
| 2006/0187846 | A1 | 8/2006 | Pelletier et al. | |
| 2016/0006784 | A1* | 1/2016 | Lee | H04L 69/04 |
| | | | | 370/474 |
| 2017/0085615 | A1* | 3/2017 | Agrawal | H04L 65/604 |
| 2017/0091014 | A1* | 3/2017 | Bressanelli | G06F 11/0793 |

OTHER PUBLICATIONS

Ghyslain Pelletier et al., "RObust Header Compression Version 2 (ROHCv2): Profiles for RTP, UDP, IP, ESP and UDP-Lite", Apr. 2008, p. 1-124, The IETF Trust.

Lars-Erik Jonsson et al., "RObust Header Compression (ROHC): A Compression Profile for IP", Jun. 2004, p. 1-16, The Internet Society.

Henning Schulzrinne et al., "RTP: A Transport Protocol for Real-Time Applications", Jul. 2003, p. 1-104, The Internet Society.

* cited by examiner

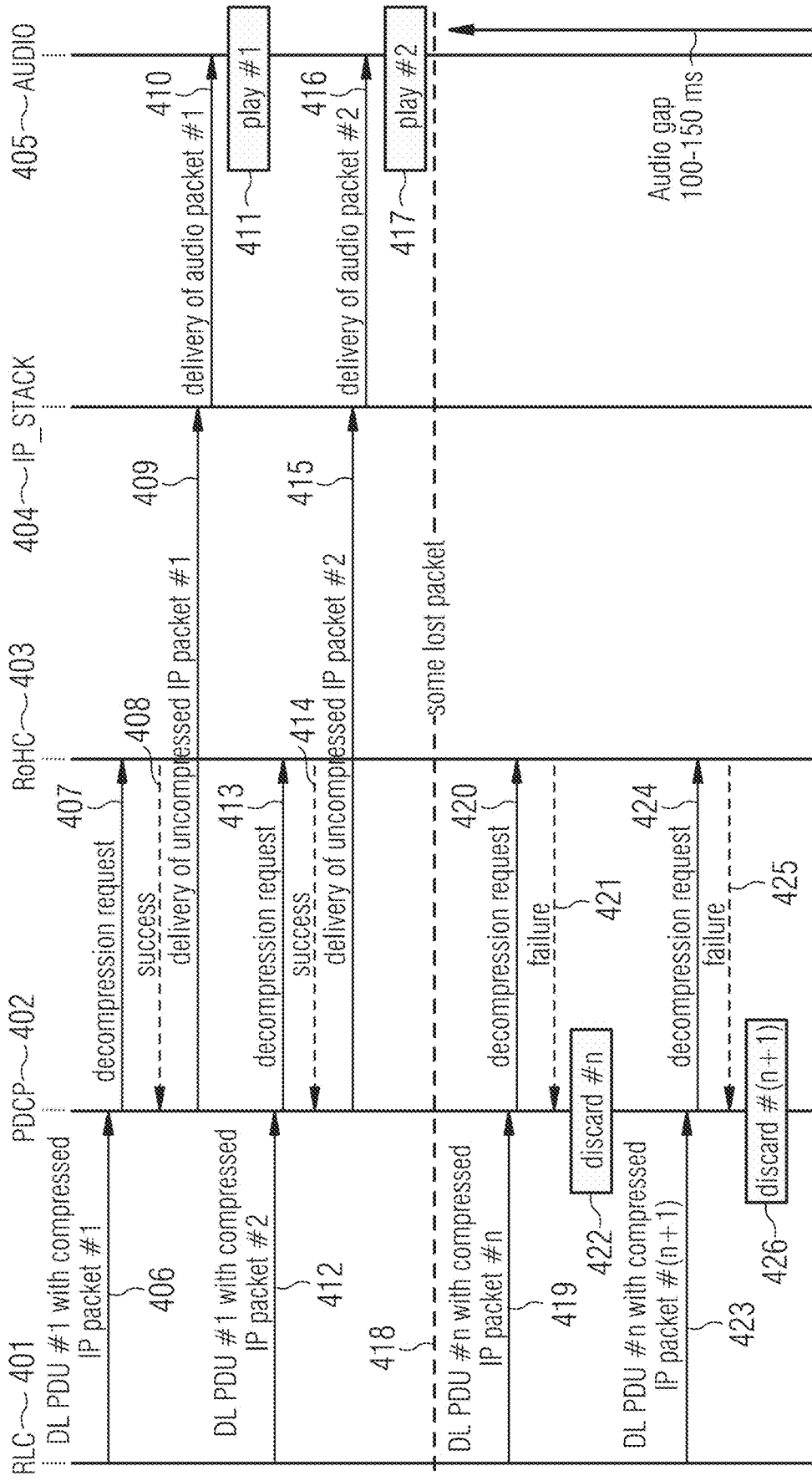

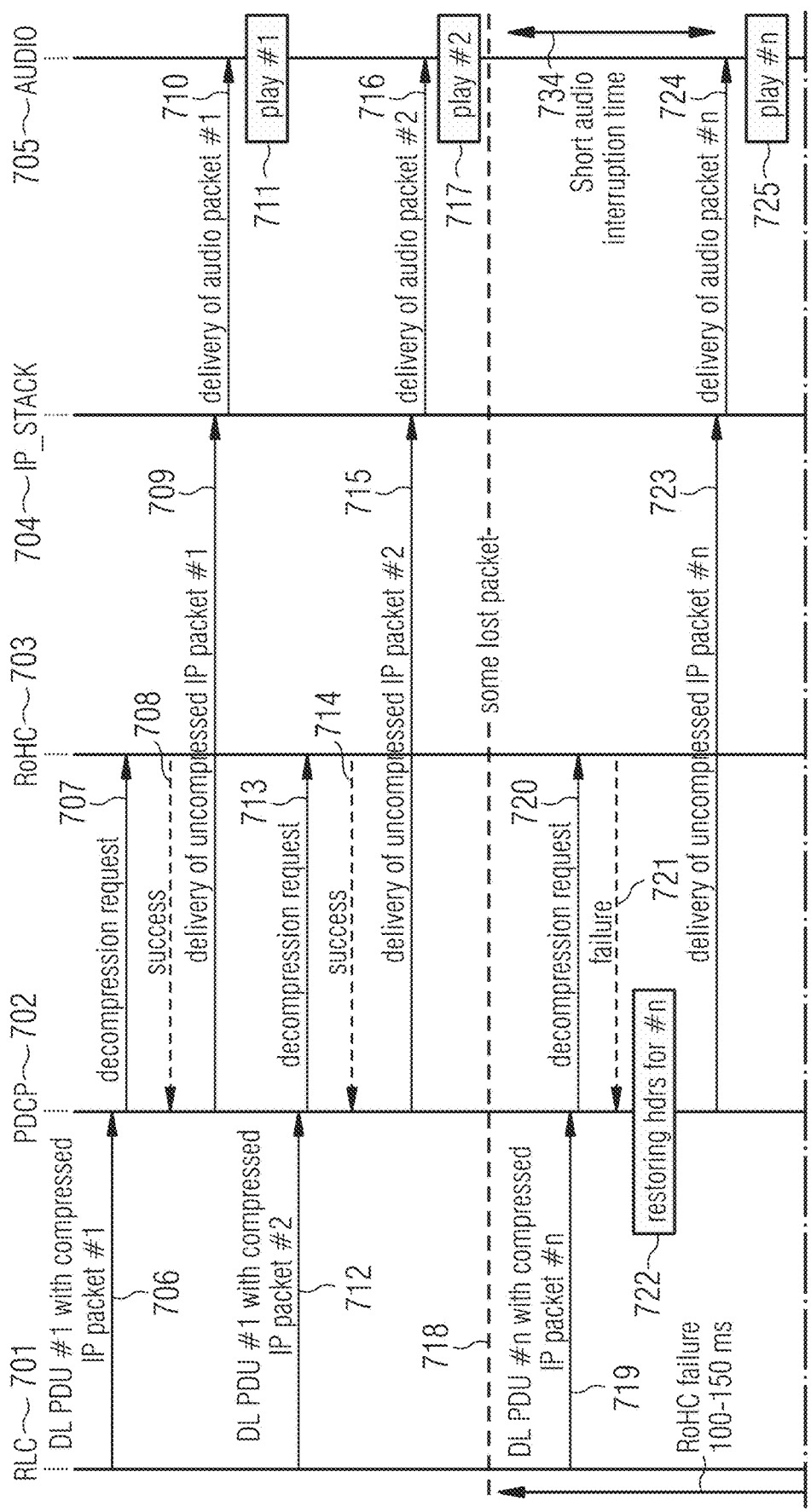

APPARATUS ADAPTED FOR MAINTAINING RECEIVING DATA QUALITY AND METHOD FOR RECEIVING DATA

CROSS-REFERENCE TO RELATED APPLICATIONS

This application claims priority to European Patent Application Serial No. 16 177 155.5, which was filed on Jun. 30, 2016, and is incorporated herein by reference in its entirety.

TECHNICAL FIELD

Embodiments described herein generally relate to apparatuses adapted for maintaining receiving data quality and methods for receiving data.

BACKGROUND

Media data are typically transmitted via a communication network by encapsulating the data in packets including headers according to the communication protocols used. To make the data transmission more efficient, headers may be compressed. However, it may occur that a compressed header of a packet cannot be decompressed, for example in case that one or more packets preceding the packet in a sequence of packets have been lost and information necessary for decompressing the header is therefore not available on the receiver side. This may lead to an interruption of a media stream, e.g. an audio gap, on the receiver side. Approaches that allow avoiding such a kind of audio gaps or keeping such a kind of audio gaps as small as possible are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
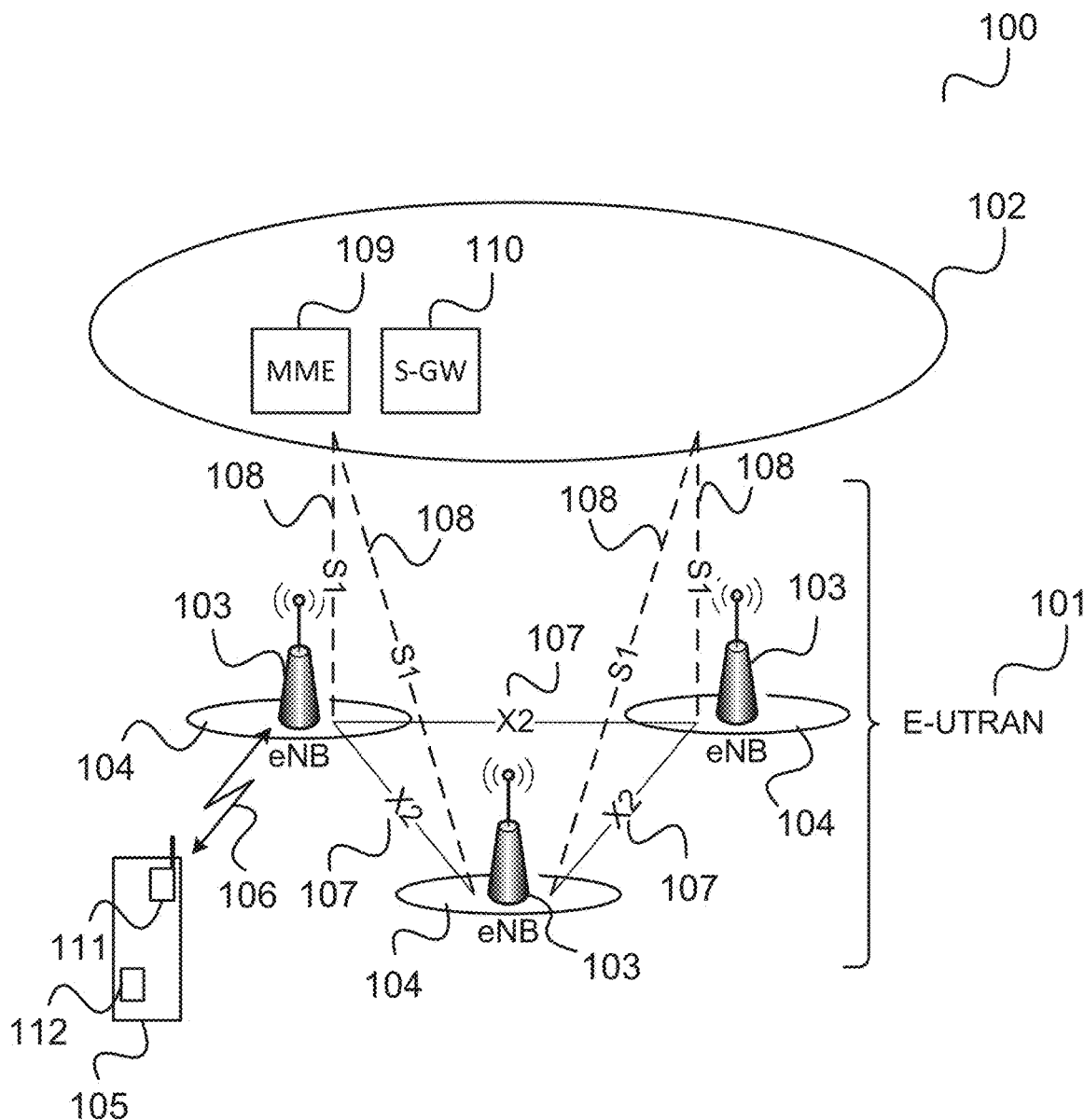
FIG. 1 shows an example for a communication system according to LTE (Long Term Evolution).

FIG. 1 shows a communication system 100, e.g. an LTE (Long Term Evolution) communication system.

The communication system 100 includes a radio access network (e.g. an E-UTRAN, Evolved UMTS (Universal Mobile Communications System) Terrestrial Radio Access Network according to LTE) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101.

A mobile terminal (also referred to as UE, user equipment, or MS, mobile station) 105 located in one of the mobile radio cells 104 (in this example the leftmost radio cell 104) may communicate with the core network 102 and with other mobile terminals 105 via the base station providing coverage in (in other words operating) the mobile radio cell.

Control and user data are transmitted between a base station 103 and a mobile terminal 105 located in the mobile radio cell 104 operated by the base station 103 over the air interface 106 on the basis of a multiple access method.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109, and a Serving Gateway (S-GW) 110. For example, the MME 109 is responsible for controlling the mobility of mobile terminals located in the coverage area of E-UTRAN, while the S-GW 110 is responsible for handling the transmission of user data between mobile terminals 105 and core network 102.

The radio access network 101 and the core network may support communication according to various communication technologies, e.g. mobile communication standards. For example, each base station 103 may provide a radio communication connection via the air interface between itself and the mobile terminal 105 according to LTE, UMTS, GSM (Global System for Mobile Communications), GPRS (General Packet Radio Service), EDGE (Enhanced Data Rates for GSM Evolution) radio access. Accordingly, the radio access network 102 may operate as an E-UTRAN, a UTRAN, a GSM radio access network, or a GERAN (GSM EDGE Radio Access Network). Analogously, the core network 102 may include the functionality of an EPC, a UMTS core network or a GSM core network. The approaches described herein may also be applied to future RAT technologies such as 5G.

For uplink radio communication via the air interface 106, the mobile terminal 105 includes a radio transmitter (TX RF) 111.

The mobile terminal 105 may include an identity module 112 (e.g. implemented by a chip card) that allows the mobile terminal 105 to identify itself as a subscriber of the communication network (e.g. as an LTE subscriber) formed by the radio access network 101 and the core network 102 and thus to use the communication network as a home network.

According to LTE, the mobile terminal 105 may communicate with another communication device, e.g. with another mobile terminal, via Voice-over-LTE (VoLTE).

Figure 2:
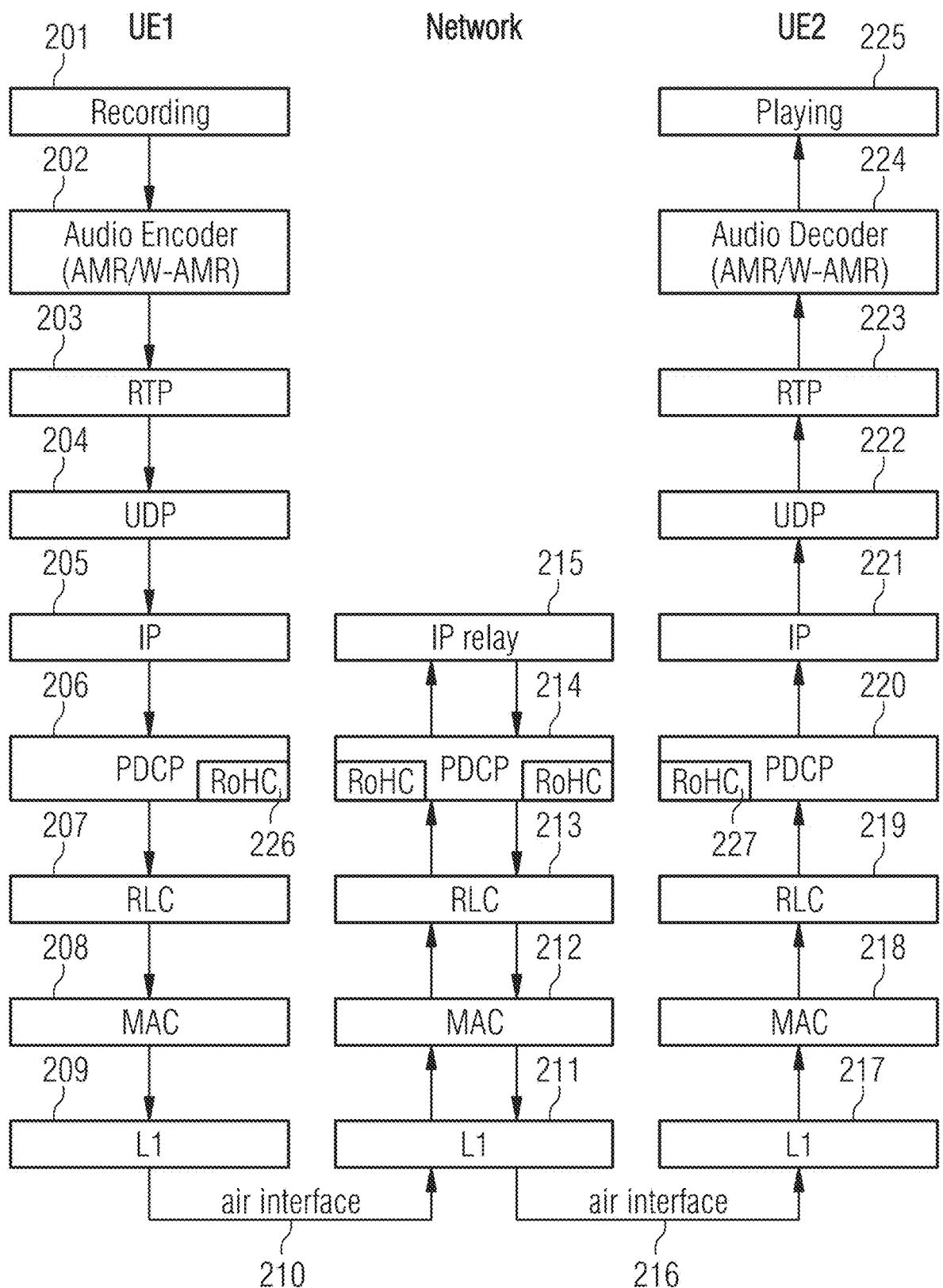
FIG. 2 shows the protocol layers involved in a VoLTE (Voice over LTE) use case for the example of a VoLTE connection between two mobile terminals.

FIG. 2 shows the protocol layers involved in a VoLTE use case for the example of a VoLTE connection between two mobile terminals (UE1 and UE2), e.g. corresponding to mobile terminal 105, via an LTE network, e.g. corresponding to the radio access network 101.

In UE1 audio data is recorded by an audio recording application 201 and encoded by an audio encoder 202. The encoded audio data are then processed by the RTP (Real-Time Transport Protocol) layer 203, the UDP (User Datagram Protocol) layer 204 and the IP protocol layer 205 to encapsulate the encoded data into IP/UDP/RTP packets. The packets are forwarded to the LTE protocol stack (or another protocol stack depending on the communication network used, e.g. a 3G or a 5G network) including PDCP layer 206, RLC layer 207, MAC layer, and layer 1 (physical layer) L1 and, after corresponding processing in the LTE protocol stack, sent to the network via air interface 210.

The network relays the data on the IP level i.e. the data traverses layer 1 211, MAC layer 212, RLC layer 213, PDCP layer 214 (including RoHC decompression) up to the IP layer 215 and, after relaying on IP level, down again via PDCP layer 214 (including RoHC compression), RLC layer 213, MAC layer 212 to physical layer 211 and is sent to the receiver in UE2 via the air interface 216. It should be noted that the relaying may also be taking in a different way, e.g. using a media gateway. In UE2 the data traverses the protocol stack of layer 1 217, MAC layer 218, RLC layer 219, PDCP layer 220, IP layer 21, UDP layer 222 and RTP layer 223 in opposite order than in UE1, is decoded by a decoder 224 and finally output by an audio output application 225.

If configured, the PDCP layer 206 on the sender side (UE1) compresses a higher layer header (e.g. the RTP/UDP/IP header or the UDP/IP header depending on the RoHC profile) of a packet using a RoHC (Robust Header Compression) compressor 226 before sending. On the receiver side (UE2), the PDCP layer 220 decompresses the header by a RoHC decompressor 227 before forwarding the packet to the higher layers.

In 3GPP LTE, UMTS and GPRS header compression algorithms are applicable to reduce the additional overhead on the air interface 106. In case of LTE and UMTS the compression is executed by PDCP (Packet Data Convergence Protocol) sub-layer, in GPRS this is done by SNDCP (Sub Network Dependent Convergence Protocol). Mostly, header compression is an optional feature, but especially for the Voice-over-LTE (VoLTE) use case the RoHC algorithm is typically mandatory.

Figure 3:
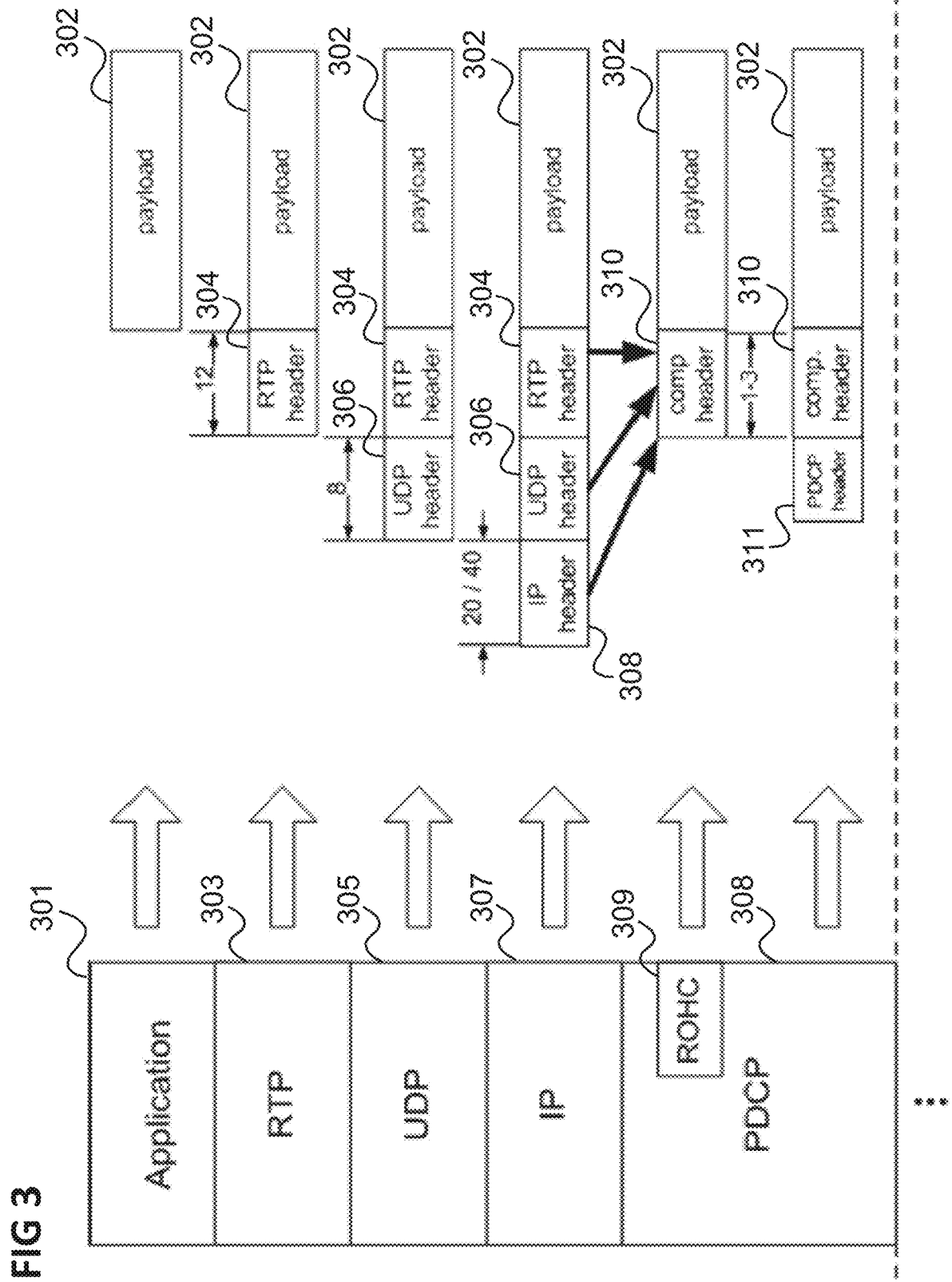
FIG. 3 illustrates the protocol headers added to deliver voice over IP data (i.e. for data encapsulation) on a cellular network such as the communication system of FIG. 1.

FIG. 3 illustrates the protocol headers added to deliver voice over IP data (i.e. for data encapsulation) on a cellular network such as the communication system 100.

On application layer 301, which in case of Voice over IP corresponds to the audio sub-system, provides the payload, i.e. the audio data. RTP layer adds an RTP header 304, UDP layer 305 adds an UDP header 306 and IP layer 307 adds an IP header 308.

In PDCP layer 308, the RTP header 304, the UDP header 306 and the IP header 308 can be compressed using the RoHC algorithm to generate a compressed header 310. The PDCP layer 308 then further adds a PDCP header 311 and the resulting packet is given to the lower layers as explained with reference to FIG. 2. On the receiver side, RoHC decompression is correspondingly executed in the PDCP layer.

Only the protocol layer headers 304, 306, 308 are compressed with RoHC. The user data (in case of VoLTE call, the audio payload 302) is not compressed. Which protocol layer headers 304, 306, 308 are compressed depends on the configured RoHC profile. For Voice over LTE use cases, the following RoHC profile are for example applicable:

RoHC Profile 1 (RTP/UDP/IP), as illustrated in FIG. 3
RoHC Profile 2 (UDP/IP)

Other profiles may also be used such as 0x0101 ROHCv2 RTP, 0x0102 ROHCv2 UDP and 0x0004 RoHC IP (RFC3843).

In case of RoHC decompression failures in downlink (DL) direction (i.e. on the side of UE2 in the example FIG. 2), the upper layer headers (for instance IP, UDP and RTP header) cannot be reconstructed and consequently the PDCP layer 220 in the cellular protocol stack cannot deliver the IP data to the IP stack. Thus UE2 cannot decompress the header of all subsequent packets (e.g. of a VoLTE connection to UE1) as well until it has received an uncompressed full header (of the VoLTE connection) because to decompress a header the information of the previous packet is required. As the packet is missing the following packet cannot be decompressed as well. Once a RoHC header decompression failure happens, the PDCP layer 220 sends a RoHC feedback (negative ACK) to the network in order to request an uncompressed header for resynchronisation. From observation in commercial networks, it takes about 100-150 ms until a mobile terminal can again receive a new uncompressed frame in such a case. This leads to an audio gap of 100-150 ms. The consequence is a voice quality degradation due to the audio gap but also due to jitter buffer adaptation to compensate audio frame loss.

As RoHC decompression depends on the previously received frames, a RoHC decompression failure can happen as soon as one PDCP frame is missing. This can easily happen in case of degraded radio conditions. As a consequence one data block not properly decoded by the receiver (e.g. mobile terminal 105) can lead to an audio gap of 150 ms.

Figure 4B:
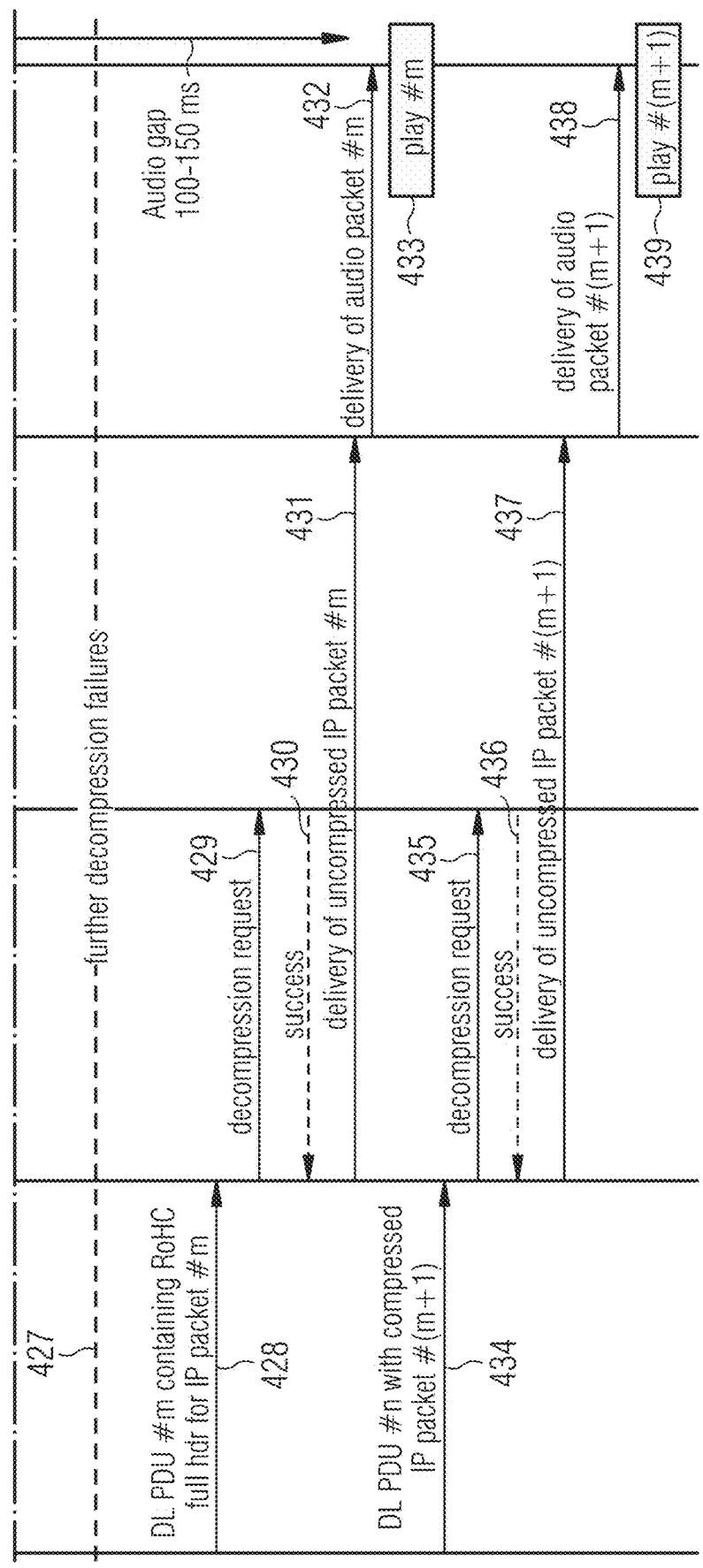
FIG. 4 shows an example of a scenario with packet loss leading to a header decompression failure.

FIG. 4 shows an example of a scenario with packet loss leading to RoHC decompression failure (leading to up to 150 ms recovery time).

The example is shown with respect to RLC layer 401 corresponding to RLC layer 219, PDCP layer 402 corresponding to PDCP layer 220, RoHC 403 corresponding to RoHC 227, IP stack 404 corresponding to IP layer 221, UDP layer 222 and RTP layer 223 and audio subsystem 405 corresponding to audio decoder 224 and audio playback application 225.

In 406, the RLC layer 401 forwards a PDU (Protocol Data Unit) received in downlink with a compressed IP packet #1 (i.e. including a compressed header) of a sequence of packets for a VoLTE connection to the PDCP layer 402. In 407, the PDCP layer 402 sends a decompression request for IP packet #1 to the RoHC 403. It is assumed that RoHC 403 successfully decompresses the header of IP packet #1 and sends the uncompressed header to PDCP layer 402 in 408. The PDCP layer 402 delivers the uncompressed IP packet #1 to the IP stack 404 in 409 and the IP stack 404 delivers, in 410, after corresponding processing, the audio packet #1 of IP packet #1 to the audio subsystem 405 which outputs the audio data of audio packet #1 in 411.

Similarly, for a second IP packet #2 of the sequence of packets for the VoLTE connection, in 412, the RLC layer 401 forwards a PDU (Protocol Data Unit) received in downlink with the compressed IP packet #2 (i.e. including a compressed header) to the PDCP layer 402. In 413, the PDCP layer 402 sends a decompression request for IP packet #2 to the RoHC 403. It is assumed that RoHC 403 successfully decompresses the header of IP packet #2 and sends the uncompressed header to PDCP layer 402 in 414. The PDCP layer 402 delivers the uncompressed IP packet #2 to the IP stack 404 in 415 and the IP stack 404 delivers, in 416, after corresponding processing, the audio packet #2 of IP packet #2 to the audio subsystem 405 which outputs the audio data of audio packet #2 in 417.

Thus, multiple packets are successfully received but it is assumed that at some point in time, in 418, a packet of the sequence of packets for the VoLTE connection is lost, i.e. is not received by UE2.

For a subsequent IP packet # n of the sequence of packets for the VoLTE connection, in 419, the RLC layer 401 forwards a PDU (Protocol Data Unit) received in downlink with the compressed IP packet # n (i.e. including a compressed header) to the PDCP layer 402. In 420, the PDCP layer 402 sends a decompression request for IP packet # n to the RoHC 403. Since a packet has been lost before IP packet # n, RoHC 403 cannot successfully decompress the header of IP packet # n and sends a failure message to PDCP layer 402 in 421. The PDCP layer 402 then discards IP packet # n in 422.

Similarly, for the next IP packet # n+1 of the sequence of packets for the VoLTE connection, in 423, the RLC layer 401 forwards a PDU (Protocol Data Unit) received in downlink with the compressed IP packet # n (i.e. including a compressed header) to the PDCP layer 402. In 424, the PDCP layer 402 sends a decompression request for IP packet # n to the RoHC entity 403. Again, since a packet has been lost, RoHC 403 cannot successfully decompress the header of IP packet # n and sends a failure message to PDCP layer 402 in 425. The PDCP layer 402 then discards IP packet # n in 426.

Thus, multiple packets are not successfully received, i.e. further decompression failures occur in 427 until UE2 receives a PDU containing a RoHC full header for an IP packet # m.

For IP packet # m of the sequence of packets for the VoLTE connection, in 428, the RLC layer 401 forwards a PDU (Protocol Data Unit) received in downlink with the IP packet # m to the PDCP layer 402. In 429, the PDCP layer 402 sends a decompression request for IP packet # m to the RoHC 403. This happens even though IP packet # m has a full header since once RoHC is configured, PDCP must send all packets as RoHC compressed packets. Since the packet includes a full uncompressed header the RoHC 403 can resynchronize and report success in 430. The PDCP layer 402 delivers the uncompressed IP packet # m to the IP stack 404 in 431 and the IP stack 404 delivers, in 431, after corresponding processing, the audio packet # m of IP packet # m to the audio subsystem 405 which outputs the audio data of audio packet # m in 417.

For the subsequent IP packet # m+1 of the sequence of packets for the VoLTE connection, in 434, the RLC layer 401 forwards a PDU (Protocol Data Unit) received in downlink with the compressed IP packet # m+1 (i.e. including a compressed header) to the PDCP layer 402. In 435, the PDCP layer 402 sends a decompression request for IP packet # m+1 to the RoHC 403. Now being resynchronized, it is assumed that RoHC 403 successfully decompresses the header of IP packet # m+1 and sends the uncompressed header to PDCP layer 402 in 436. The PDCP layer 402 delivers the uncompressed IP packet # m+1 to the IP stack 404 in 437 and the IP stack 404 delivers, in 438, after corresponding processing, the audio packet # m+1 of IP packet # m+1 to the audio subsystem 405 which outputs the audio data of audio packet #2 in 439.

In case of the RoHC decompression issue as described in the problem statement and illustrated in FIG. 4, dropped IP data leads to an audio gap 240 of for example 100-150 ms.

In the following, approaches are described in which instead of dropping the data, the PDCP layer 220 extracts the audio payload and delivers the audio payload to the audio sub-system 224, 225. This allows achieving a much shorter audio interruption time.

For example, in order to detect and deliver audio data to the audio sub-system 224, 225 in case of RoHC decompression failure, the PDCP component 220 shall:

- Identify the RoHC header (i.e. the compressed header) and the audio payload
- (option 1) Reconstruct the missing header based on the latest successfully decompressed headers and the RoHC profile in use, then deliver the IP packet following the standard path (i.e. via IP layer, UDP, RTP), or, as alternative
- (option 2) Extract the audio payload from the PDCP SDU (service data unit) with or without RTP header and deliver the audio data to the audio subsystem 224 along with information for audio data re-ordering, 225 using a dedicated interface between PDCP layer 220 and audio subsystem 224, 225.

Figure 5:
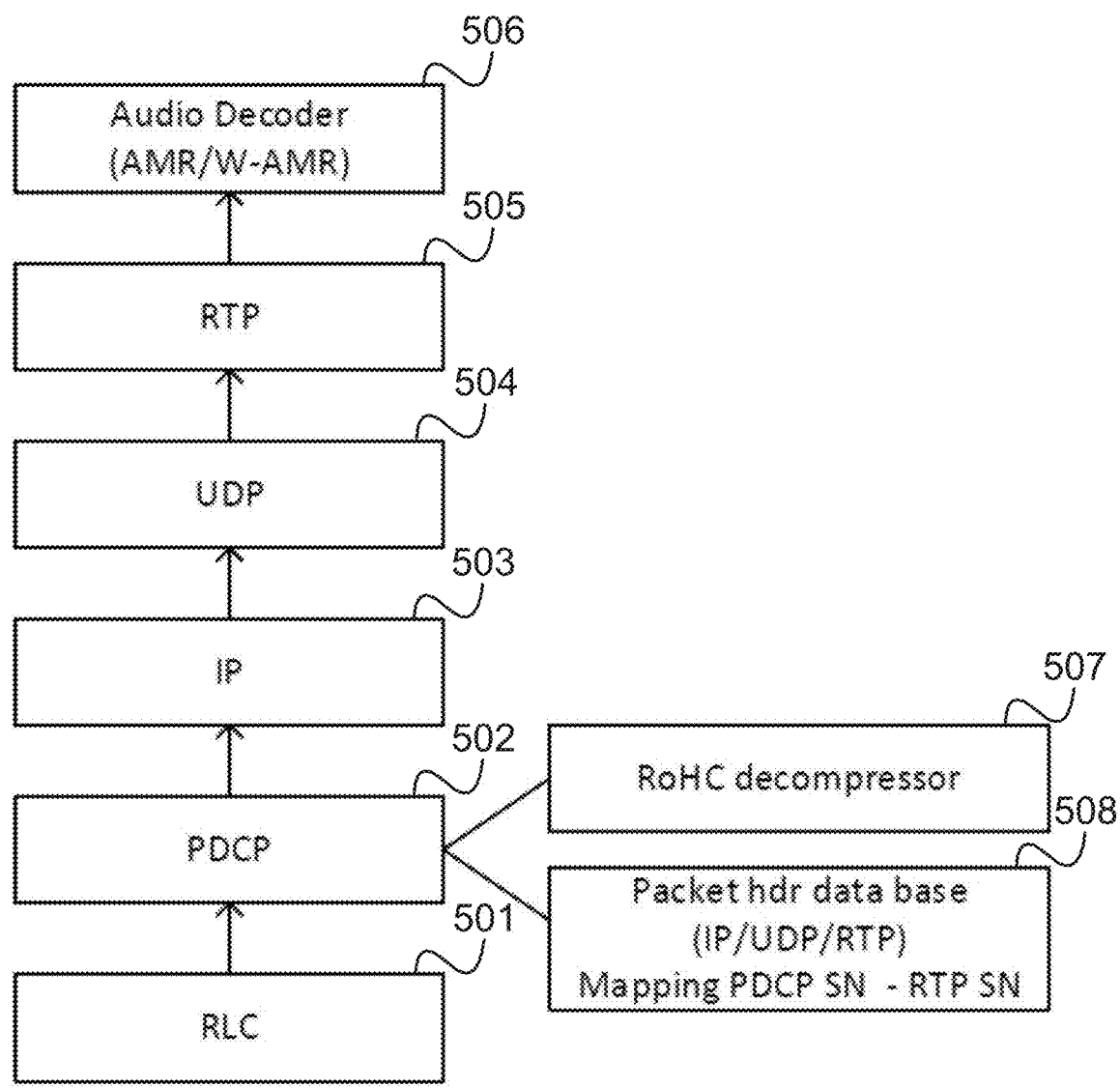
FIG. 5 shows an example of the software architecture for a first approach to handle a header decompression failure.

FIG. 5 shows an example of the software architecture for option 1.

Corresponding to FIG. 2 on the side of UE2, the architecture includes an RLC layer 501, a PDCP layer 502, an IP layer 503, a UDP layer 504, an RTP layer 505 and an audio decoder 506. The PDCP 502 includes an RoHC decompressor 507 and, in addition, a packet header database 508 for IP/UDP/RTP headers and including a mapping of PDCP packet sequence numbers to RTP packet sequence numbers.

Figure 6:
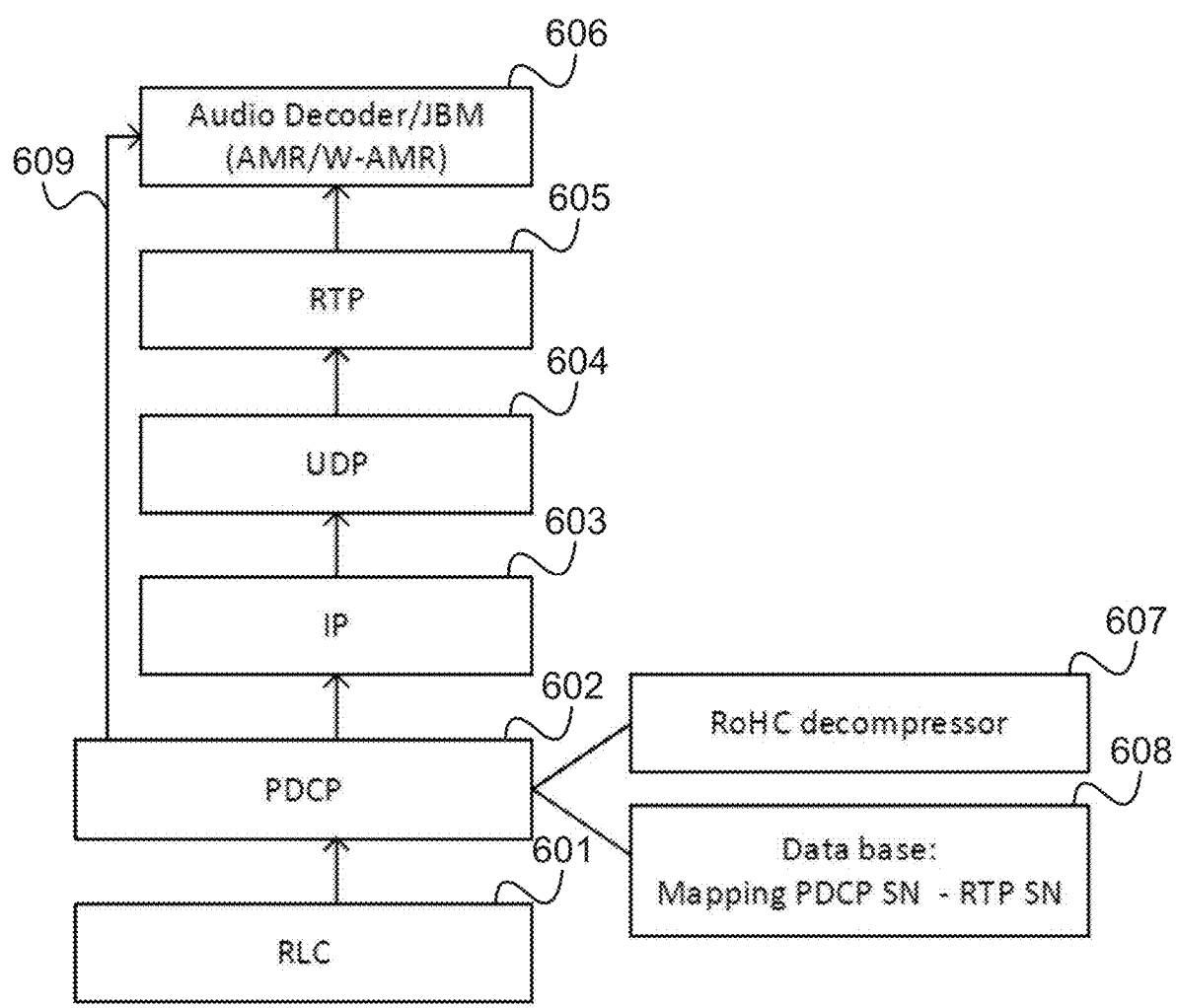
FIG. 6 shows an example of the software architecture for a second approach to handle a header decompression failure.

FIG. 6 shows an example of the software architecture for option 2.

Corresponding to FIG. 2 on the side of UE2, the architecture includes an RLC layer 601, a PDCP layer 602, an IP layer 603, a UDP layer 604, an RTP layer 605 and an audio decoder 606. The PDCP 602 includes an RoHC decompressor 607 and, in addition, a database 608 including a mapping of PDCP packet sequence numbers to RTP packet sequence numbers.

Further, the architecture includes a direct interface 609 (i.e. an interface circumventing the IP stack layers 603, 604, 605) between the PDCP layer 602 and the audio decoder 606 (and thus the audio subsystem).

Figure 7B:
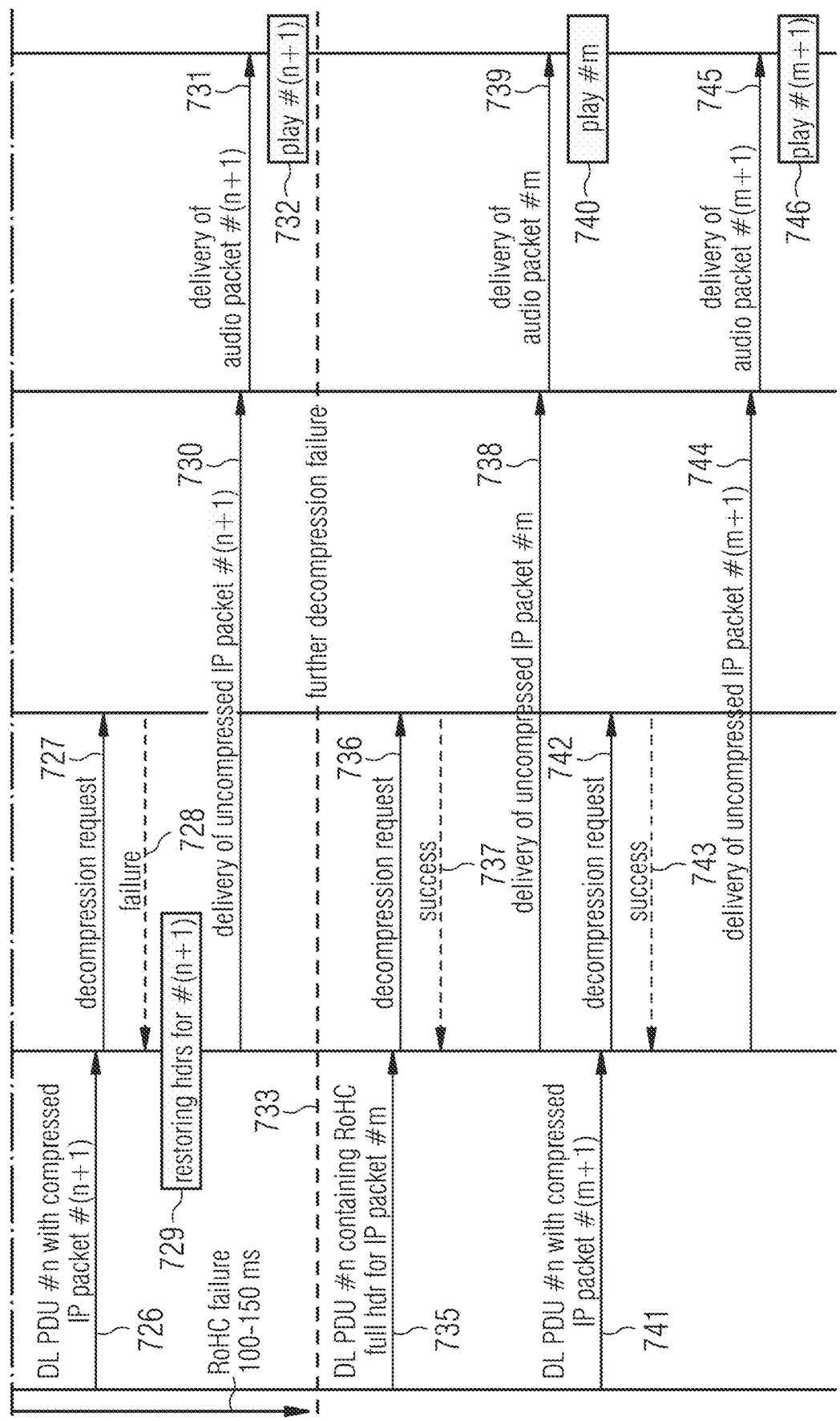
FIG. 7 shows an example of audio data recovery after RoHC decompression failure which allows achieving a shorter audio interruption time compared to the example of FIG. 4.

FIG. 7 shows an example of audio data recovery after RoHC decompression failure which allows achieving a shorter audio interruption time compared to the example of FIG. 4.

Similarly to FIG. 4, the example is shown with respect to RLC layer 701 corresponding to RLC layer 219, PDCP layer 702 corresponding to PDCP layer 220, RoHC entity 703 corresponding to RoHC 227, IP stack 704 corresponding to IP layer 221, UDP layer 222 and RTP layer 223 and audio subsystem 705 corresponding to audio decoder 224 and audio playback application 225.

Similarly to FIG. 4, in 706, the RLC layer 701 forwards a PDU (Protocol Data Unit) received in downlink with a compressed IP packet #1 (i.e. including a compressed header) of a sequence of packets for a VoLTE connection to the PDCP layer 702. In 707, the PDCP layer 702 sends a decompression request for IP packet #1 to the RoHC 703. It is assumed that RoHC 703 successfully decompresses the header of IP packet #1 and sends the uncompressed header to PDCP layer 702 in 708. The PDCP layer 702 delivers the uncompressed IP packet #1 to the IP stack 704 in 709 and the IP stack 704 delivers, in 710, after corresponding processing, the audio packet #1 of IP packet #1 to the audio subsystem 705 which outputs the audio data of audio packet #1 in 711.

Further, for a second IP packet #2 of the sequence of packets for the VoLTE connection, in 712, the RLC layer 701 forwards a PDU (Protocol Data Unit) received in downlink with the compressed IP packet #2 (i.e. including a compressed header) to the PDCP layer 702. In 713, the PDCP layer 702 sends a decompression request for IP packet #2 to the RoHC 703. It is assumed that RoHC 703 successfully decompresses the header of IP packet #2 and sends the uncompressed header to PDCP layer 702 in 714. The PDCP layer 702 delivers the uncompressed IP packet #2 to the IP stack 704 in 715 and the IP stack 704 delivers, in 716, after corresponding processing, the audio packet #2 of IP packet #2 to the audio subsystem 705 which outputs the audio data of audio packet #2 in 717.

Thus, multiple packets are successfully received but it is assumed that at some point in time, in 718, a packet of the sequence of packets for the VoLTE connection is lost, i.e. is not received by UE2.

For a subsequent IP packet # n of the sequence of packets for the VoLTE connection, in 719, the RLC layer 701 forwards a PDU (Protocol Data Unit) received in downlink with the compressed IP packet # n (i.e. including a compressed header) to the PDCP layer 702. In 720, the PDCP layer 702 sends a decompression request for IP packet # n to the RoHC 703. Since a packet has been lost before IP packet # n, RoHC 703 cannot successfully decompress the header of IP packet # n and sends a failure message to PDCP layer 702 in 721. However, in this example, instead of discarding IP packet # n, the PDCP layer 702 extracts the payload from the IP packet # n in 722 and restores its header according to option 1 and, in 723, transmits the audio packet # n of IP packet # n with restored header to the IP stack 704 and the IP stack 704 delivers, in 724, after corresponding processing, the audio subsystem 705 which outputs the audio data of audio packet # n in 725. Alternatively, according to option two, the PDCP layer 702 determines a RTP sequence number of the audio packet # n (i.e. the audio payload of IP packet # n) and transmits the audio packet # n and the sequence number directly to the audio system 705.

Similarly, for the next IP packet # n+1 of the sequence of packets for the VoLTE connection, in 726, the RLC layer 701 forwards a PDU (Protocol Data Unit) received in downlink with the compressed IP packet # n+1 (i.e. including a compressed header) to the PDCP layer 702. In 727, the PDCP layer 702 sends a decompression request for IP packet # n+1 to the RoHC 703. Again, since a packet has been lost before IP packet # n, RoHC 703 cannot successfully decompress the header of IP packet # n+1 and sends a failure message to PDCP layer 702 in 728. Instead of discarding IP packet # n, the PDCP layer 702 extracts the payload from the IP packet # n+1 in 729 and restores its headers according to option 1 and, in 730, transmits the audio packet # n+1 of IP packet # n+1 with restored headers to the IP stack 704 and the IP stack 704 delivers, in 731, after corresponding processing, the audio subsystem 705 which outputs the audio data of audio packet # n+1 in 732. Alternatively, according to option two, the PDCP layer 702 determines a RTP sequence number of the audio packet # n+1 (i.e. the audio payload of IP packet # n) and transmits the audio packet # n+1 and the sequence number directly to the audio system 705.

Thus, even though multiple packets are not successfully received, i.e. further decompression failures occur in 733 for multiple packets, there is only a short audio interruption time 734 due to the missed audio data contained in the lost packet while the RoHC failure continues, e.g. with a length of 100-150 ms until UE2 receives a PDU containing a RoHC full header for an IP packet # m.

For IP packet # m of the sequence of packets for the VoLTE connection, in 735, the RLC layer 701 forwards a PDU (Protocol Data Unit) received in downlink with the IP packet # m to the PDCP layer 702. In 736, the PDCP layer 702 sends a decompression request for IP packet # m to the RoHC 703. Since the packet includes a full uncompressed header the RoHC 703 can resynchronize and report success in 737. The PDCP layer 702 delivers the uncompressed IP packet # m to the IP stack 704 in 738 and the IP stack 704 delivers, in 739 after corresponding processing, the audio packet # m of IP packet # m to the audio subsystem 705 which outputs the audio data of audio packet # m in 740.

For the subsequent IP packet # m+1 of the sequence of packets for the VoLTE connection, in 741, the RLC layer 701 forwards a PDU (Protocol Data Unit) received in downlink with the compressed IP packet # m+1 (i.e. including a compressed header) to the PDCP layer 702. In 742, the PDCP layer 702 sends a decompression request for IP packet # m+1 to the RoHC 703. Now being resynchronized, it is assumed that RoHC 703 successfully decompresses the header of IP packet # m+1 and sends the uncompressed header to PDCP layer 702 in 743. The PDCP layer 702 delivers the uncompressed IP packet # m+1 to the IP stack 704 in 744 and the IP stack 704 delivers, in 745, after corresponding processing, the audio packet # m+1 of IP packet # m+1 to the audio subsystem 705 which outputs the audio data of audio packet #2 in 746.

In the following, approaches for detection (or extraction) of the audio payload from a packet having a header which cannot be decompressed are described. As illustrated in FIG. 3, after RoHC header compression, the data packed is constituted of a compressed RoHC header 310 and the payload 302.

In case of a VoLTE call, the audio payload 302 consists of AMR (adaptive multi-rate) payload or EVS (Enhanced Voice Service) payload if RoHC profile 1 is used or and RTP header+AMR payload if RoHC profile 2 is used (this means that in case of RoHC profile 2 the RTP header 304, which is not compressed for by RoHC profile 2, is considered to be part of the payload 302).

The RoHC compressed header 310 can be of variable size depending of the state of the RoHC algorithm. In order to extract the audio payload and/or reconstruct the RoHC header after decompression failure, the PDCP 220 layer identifies the size of the compressed header 310. The RoHC header size can be given by the RoHC decompressor 227 to the PDCP component 220. As alternative, the PDCP component 220 can deduce the RoHC header size based on historical information of the PDU size and RoHC header of the previously received packets, e.g. the latest packed received successfully (i.e. with decompressable header). Once the RoHC header size has been identified, the PDCP layer 220 can use one of the following approaches to retrieve and deliver audio data to the audio sub-system:

Option 1: Reconstruction of Missing Protocol Headers and Deliver to IP Stack

With this approach, in case of a RoHC decompression failure, the PDCP component 502 reconstructs the missing headers based on previously received headers stored in the data base 508.

For example, the PDCP component 502 locally stores the last IP packet delivered to the upper layers (i.e. to IP layer 503 and via the IP layer 503 to the higher layers 503, 505 and the audio subsystem including decoder 506) following the latest successful RoHC decompression along with the PDCP sequence number of this IP packet.

The PDCP component 502 can then reconstruct protocol headers of subsequent packets (which can not be decompressed due to one or more lost packets) based on:
  the RTP header, the UDP header and the IP header of the last successful decompressed header which has been stored by copying the common fields
  the number of PDCP packets missing (i.e. lost) since the last successful decompression. This allows the PDCP component 502 to recompute the RTP sequence number and IP identification field by taking into account considering that one PDCP packet contains one IP packet
  the type of the audio payload (speech or silence) that can be extracted from the AMR header and which is required to compute RTP timestamp.

The PDCP component 502 can for example reconstruct the protocol header of a packet as follows for RoHC profile 1 (RTP/UDP/IP), i.e. when RTP, UDP and IP header need to be reconstructed:
  The PDCP component 502 copies all fields are copied from the last uncompressed header (or from more than one uncompressed header if more than one or stored in the data base 5028, expect the following fields that are recomputed:
  IPv4 header
    Total length, which the PDCP component 502 recomputes based on total size of the data
    Fragment offset is not applicable (N/A) since the voice data is too small for IP segmentation
    Header checksum, which the PDCP component 502 computes using the corresponding IP checksum algorithm
    Identification, can be recomputed by incrementing the last uncompressed IP header by the number of IP packets received (or missed) between the current PDCP packet and the PDCP packet containing the last uncompressed IP header.
  IPv6 header
    Payload length, recomputed based on total size of the data
    Next header which the PDCP component 502 may set to no next header as the payload is only voice data.
  UDP header
    Length, to be recomputed
    Checksum, which the PDCP component 502 may set to 0. The checksum is then not checked by the receiving UDP layer.
  RTP header
    Sequence number (SN); considering that the LTE protocol stack delivers data in order, the PDCP component 502 can deduce the sequence number from the latest successfully decompressed RTP header and the number of lost PDCP packets (since each PDCP packet contains one RTP packet).
    Timestamp which the PDCP component 502 can compute considering:
      The timestamp of the latest successfully decompressed RTP header.
      The Number of lost PDCP packets
      The audio data type of the current audio payload. This can be detected using the audio payload header (for instance AMR header) or deduced from the audio data size.
      The time elapsed between the current PDCP packet and last successfully decompressed packet.

Figure 8:
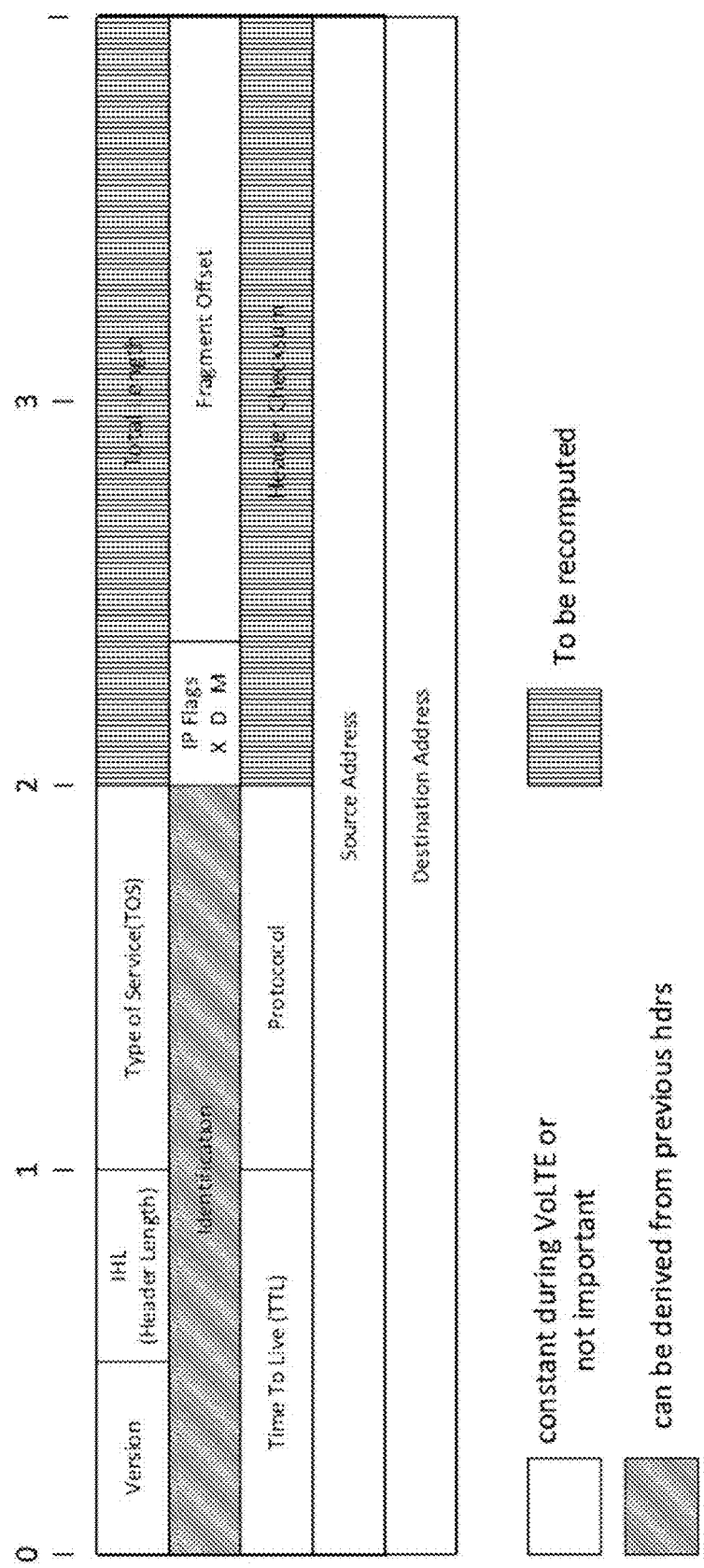
FIG. 8 shows a graphical representation of the IPv4 header with regard to header reconstruction.
Figure 9:
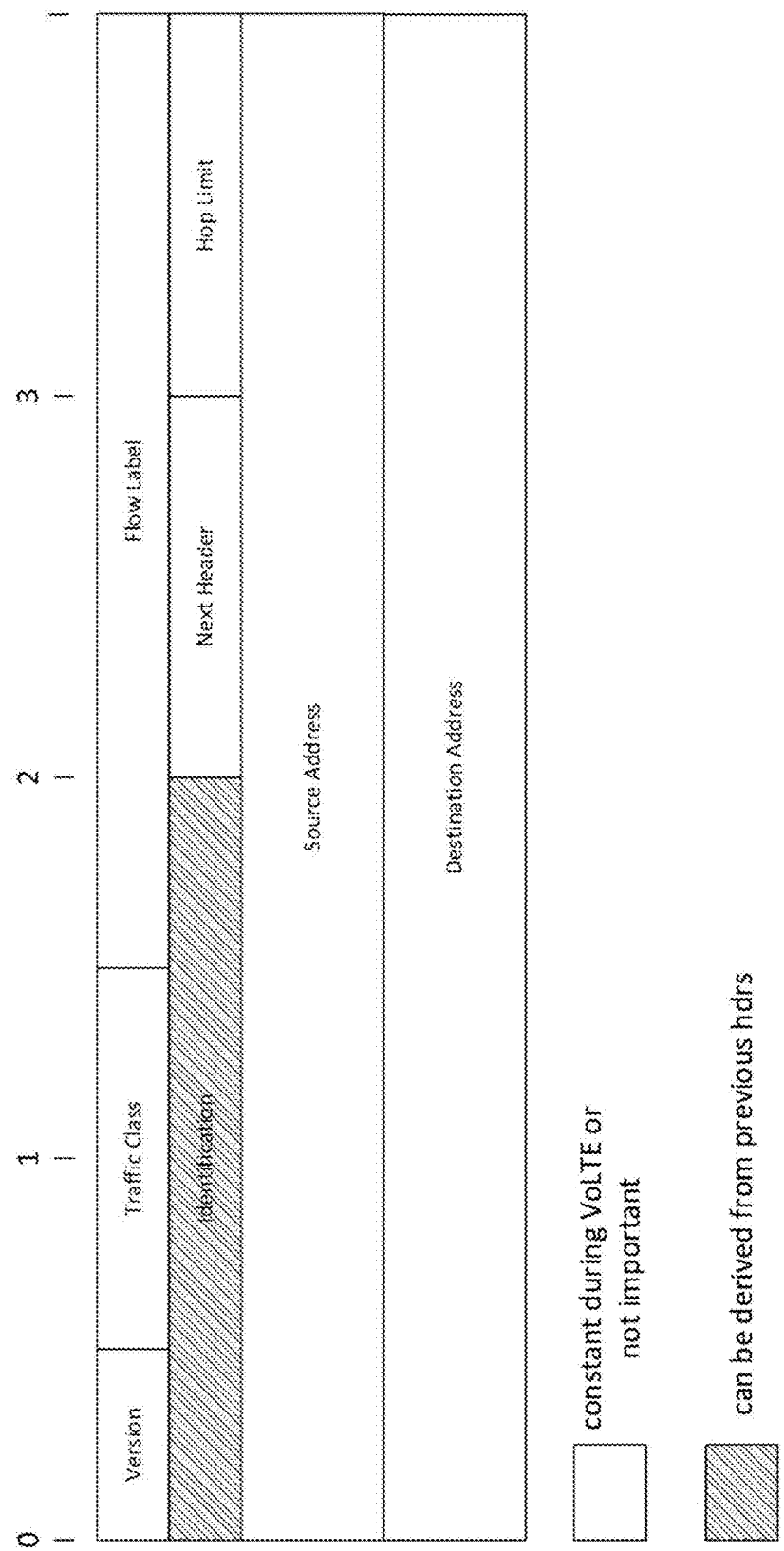
FIG. 9 shows a graphical representation of the IPv6 header with regard to header reconstruction.
Figure 10:
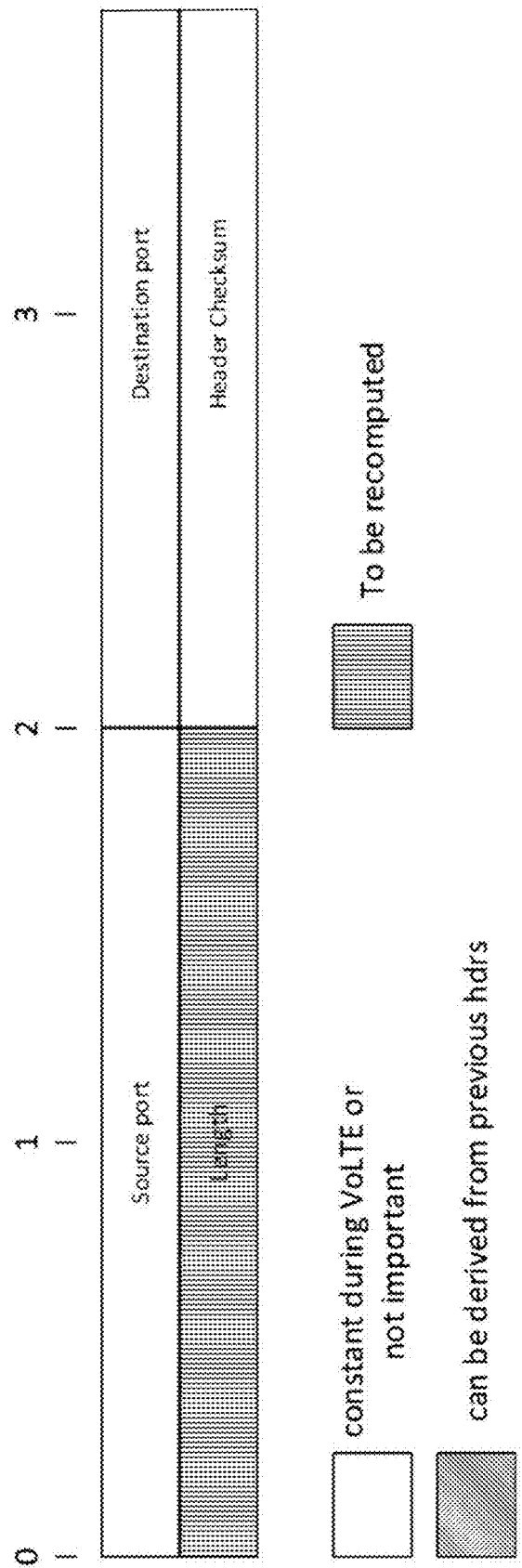
FIG. 10 shows a graphical representation of the UDP header with regard to header reconstruction.
Figure 11:
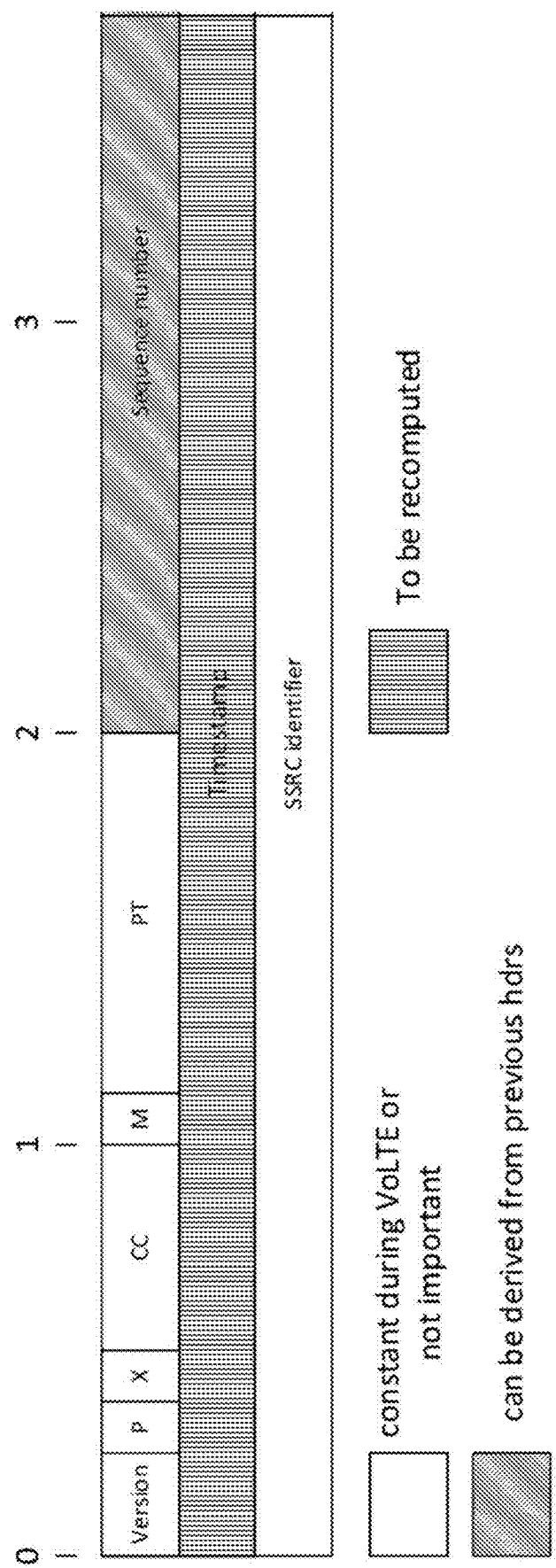
FIG. 11 shows a graphical representation of the RTP header with regard to header reconstruction.

FIGS. 8 to 11 illustrate the header reconstruction wherein:
FIG. 8 shows a graphical representation of the IPv4 header.
FIG. 9 shows a graphical representation of the IPv6 header.
FIG. 10 shows a graphical representation of the UDP header.
FIG. 11 shows a graphical representation of the RTP header.

In FIGS. 8 to 11, header parts which are constant during VoLTE or not important and shown blank, parts which can be derived from one or more previous headers are shown with diagonal hatching and parts which the PDCP 502 recomputes are shown with a vertical hatching.

Most of the protocol header fields are either constant (can be copied from previous packets) or can be derived easily (e.g. $IP\text{-}ID_{new}=IP\text{-}ID_{old}+1$).

In case of RoHC Profile 2, i.e. when the UDP header and the IP header need to be reconstructed the PDCP layer 502 can apply the same header reconstruction as for RoHC profile 1 with the exception of the RTP header which does not need to be reconstructed.

Once the protocol headers are reconstructed, the PDCP layer 502 can reconstruct the complete IP packet and deliver the IP packet to the IP stack. The audio sub-system will then receive the audio data using the legacy path, i.e. via IP layer 503, UDP layer 504 and RTP layer 505.

Option 2: Audio Payload Extraction and Direct Delivery to Audio Sub-System

With this option, the PDCP component 602 extracts directly the audio payload from the PDCP SDU without reconstructing the missing protocol header. The audio data can be extracted from the PDCP PDU and delivered to the audio sub-system. No IPSec tunnel is used for IMS voice data so audio data can directly be extracted.

The PDCP component 602 delivers the audio data to the audio sub-system using the dedicated interface 609. In order to help the audio sub-system to determine when to play the audio data, the PDCP layer 602 provides the RTP sequence number and RTP timestamp:
  If RoHC profile 2 is used, the RTP header is not compressed. The PDCP layer 602 can directly get the RTP timestamp and RTP SN from the RTP header.
  If RoHC profile 1 is used, the RTP header is compressed and the PDCP layer 602 derives the RTP timestamp and the RTP SN.

The derivation of the RTP timestamp may for example be carried out as follows: Knowing that the LTE access stratum delivers the data in sequence, the only reasonable cause for data being out of sequence is typically that there is some dis-order introduced by the core network or by the sender of the data. Accordingly, the probability to have out of order audio data delivered to the audio sub-system is low. The assumption is that the audio data in PDCP layer is delivered in sequence.

The PDCP layer 602 can determine the RTP SN based on the latest successfully uncompressed RoHC header and the number PDCP packet between the latest successfully decompressed packet and the current packet according to $$\text{Estimated } RTP\_SN(RTP \text{ frame } N) = \text{LatestSuccessfullyDelivered}\_RTP\_SN + PDCP\_SN(RTP \text{ frame } N) - PDCP\_SN(\text{LatestSuccessfullyDelivered} RTP \text{ frame})$$

wherein LatestSuccessfullyDelivered_RTP_SN is the RTP SN of the RTP packet with the latest successfully uncompressed RoHC header. The corresponding PDCP SN of the PDCP PDU containing this IP/RTP packet is PDCP_SN (LatestSuccessfullyDelivered frame).

The RTP timestamp can be computed according to (it should be noted that this approach may also be used for RTP timestamp computation in option 1):

$$RTP \text{ timestamp}(RTP \text{ frame } N) = \text{LatestSuccessfullyDelivered}\_RTP\_\text{timestamp} + \text{audioSize}(\text{missing frame}) + \text{audioSize}(\text{frame } N)$$

The audioSize (i.e. the size of the audio packet in terms of audio samples) of the frame N depends on the audio frame type (speech or silence). This can be determined using the AMR header of the current frame. The audioSize of the missing frame(s) can be estimated using the delta time (time difference) between the last successfully decompressed frame and the current frame and using the number of missing frame(s). The delta time between two audio frames is typically 20 ms. The delta time between two silence frames is typically 160 ms.

For instance, if the measured delta time is 67 ms and the number of missing frames is two and the current frame is an audio speech frame, then the missing frames are probably audio speech frames.

If the measured delta time is 365 ms and number of missing frame is 1 and the current frame is a silence frame then the missing frame is most likely a silence frame.

Figure 12:
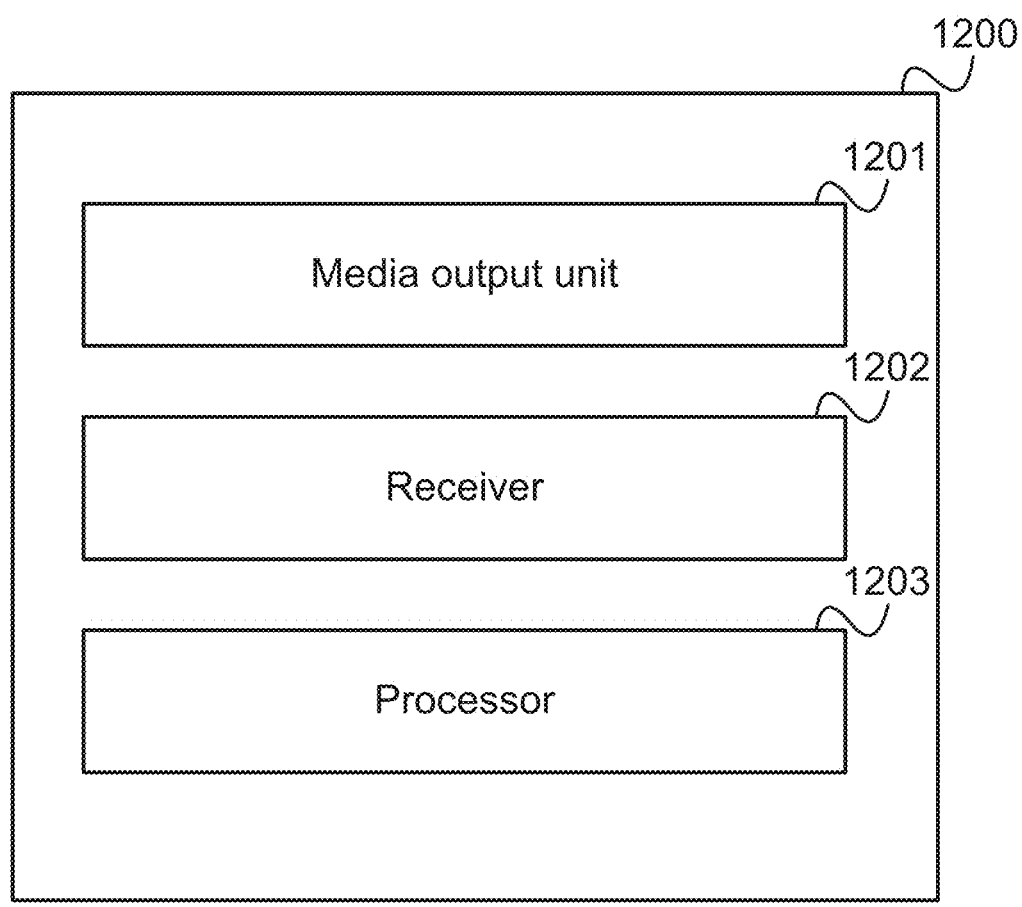
FIG. 12 shows an apparatus adapted for maintaining receiving data quality according to an embodiment.

In summary, according to various examples, an apparatus is provided as illustrated in FIG. 12.

FIG. 12 shows an apparatus 1200 adapted for maintaining receiving data quality used in a mobile communication device, according to an embodiment.

The apparatus 1200 includes a media output unit 1201 and a receiver 1202 configured to receive a packet of a sequence of packets, the packet comprising a compressed header and media payload. The apparatus 1200 further includes a processor 1203 configured to determine whether decompression of the compressed header occurs, and, based on no decompression of the compressed header, determine a sequence number of the media payload, extract the media payload from the packet and forward the media payload and the determined sequence number to the media output unit 1201.

According to various examples, in other words, a communication device such as a mobile terminal avoids discarding a packet whose header it cannot decompress, in other words it keeps at least the media payload included in the packet although it cannot decompress its header, extracts the media payload from the packet and transfers the media payload along with a sequence number of the media payload for outputting the media payload. If the receiver receives a packet with a header that it can decompress, i.e. for which decompression is not prevented, i.e. decompression occurs, the processor can normally decompress the header and forward the media payload to the media output circuit based on information from the decompressed header.

It should be noted that a header may include header information of multiple protocols. For example, the header may include UDP, IP and RTP header information.

For example, the approach described with reference to FIG. 12 allows delivering audio data to an audio sub-system of the communication device (e.g. a jitter buffer or audio decoder of the communication device) in case of RoHC decompression failure based on a functionality in the PDCP layer to Reconstruct RTP/UDP/IP protocol headers when RoHC decompression fails based on historical data and RoHC profile in use for VoLTE use case, Detect the audio payload in the PDCP data failing RoHC decompression Estimate the RTP sequence number and RTP timestamp based on lost PDCP PDU Deliver audio data to the audio sub-system
using the standard data path via protocol layers IP/UDP/RTP after reconstruction of missing headers or
using a dedicated direct interface to the audio sub-system (e.g. according to AMR or EVS), e.g. to the audio decoder or jitter buffer This approach allows the audio subsystem to play the audio even in case of RoHC decompression failure. Audio gap is then reduced improving audio quality.

The components of the apparatus or the mobile communication device (e.g. the media output circuit, the receiver and the processor) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

Figure 13:
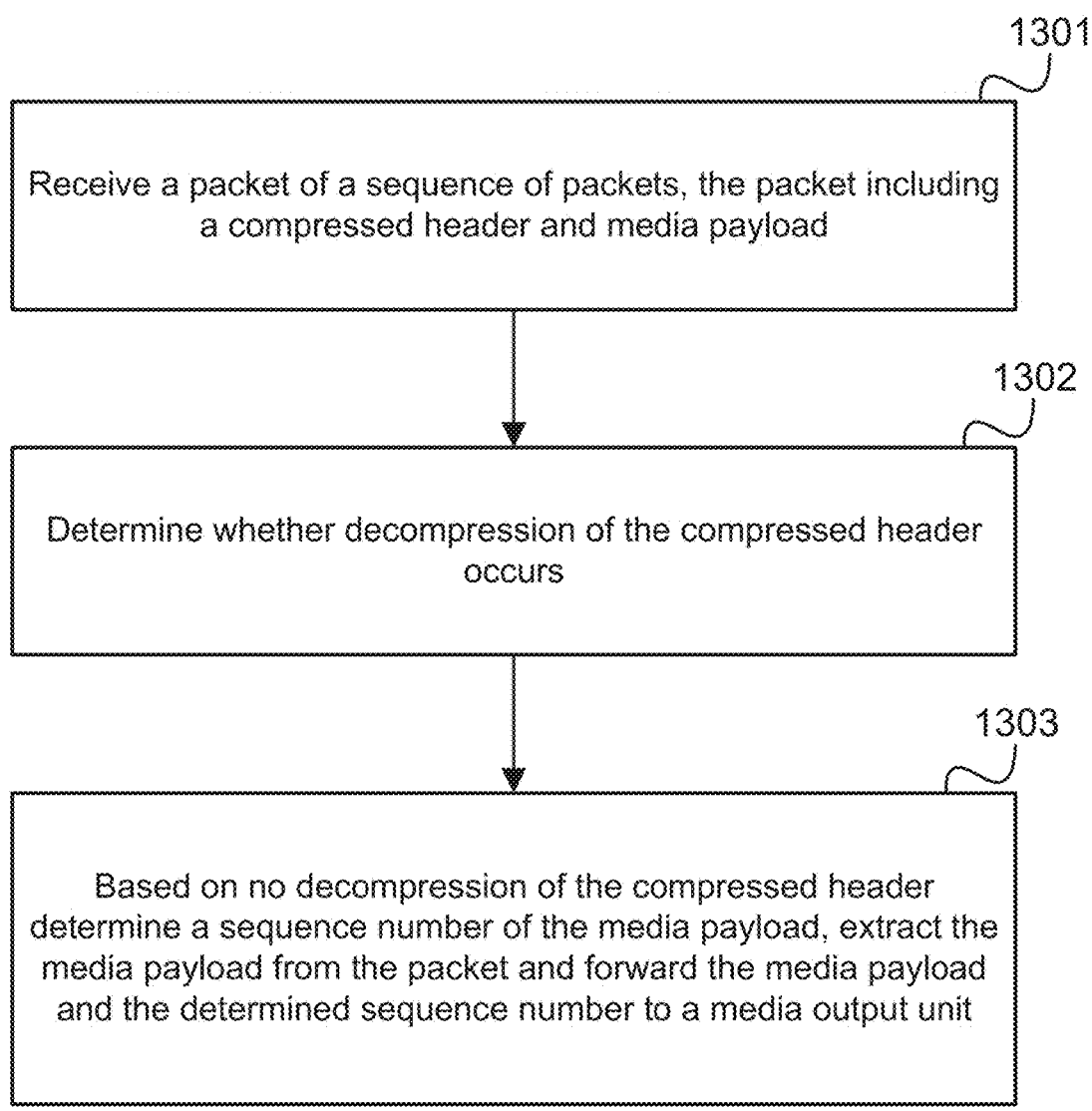
FIG. 13 shows a flow diagram illustrating a method for receiving data, for example carried out by a communication device.

The mobile communication device for example carries out a method as illustrated in FIG. 13.

FIG. 13 shows a flow diagram 1300 illustrating a method for receiving data, for example carried out by a communication device.

In 1301, the communication device receives a packet of a sequence of packets, the packet comprising a compressed header and media payload.

In 1302, the communication device determines whether decompression of the compressed header occurs.

Based on no decompression of the compressed header, the communication device, in 1303, determines a sequence number of the media payload, extracts the media payload from the packet and forwards the media payload and the determined sequence number to a media output unit.

The following examples pertain to further embodiments.

In Example 1 is an apparatus as illustrated in FIG. 12.

In Example 2, the subject-matter of Example 1 may optionally include the media payload comprising audio data.

In Example 3, the subject-matter of any one of Examples 1-2 may optionally include the media payload comprising video data.

In Example 4, the subject-matter of any one of Examples 1-3 may optionally include each packet of the sequence of packets comprising a sequence number and comprising a compressed header and a media payload.

In Example 5, the subject-matter of any one of Examples 1-4 may optionally include the processor being further configured to determine the sequence number based on information from a header of a previous packet of the sequence of audio packets.

In Example 6, the subject-matter of any one of Examples 1-5 may optionally include the previous packet being a previous packet of the sequence of audio packets received before the packet whose header was decompressed by the mobile communication device.

In Example 7, the subject-matter of any one of Examples 1-8 may optionally include a memory configured to store the sequence number of the previous packet and the processor being configured to determine the sequence number of the packet based on the stored sequence number.

In Example 8, the subject-matter of any one of Examples 1-7 may optionally include the processor being configured to reconstruct the header of the packet and being configured to forward the media payload together with the reconstructed header to the media output unit.

In Example 9, the subject-matter of Example 8 may optionally include the header of the packet including the sequence number.

In Example 10, the subject-matter of any one of Examples 8-9 may optionally include the processor being configured to reconstruct the header based on the header of a previous packet of the sequence of audio packets received before the packet whose header was successfully decompressed by the mobile communication device.

In Example 11, the subject-matter of Example 10 may optionally include a memory configured to store the header of the previous packet of the sequence of audio packets received before the packet whose header was successfully decompressed by the mobile communication device.

In Example 12, the subject-matter of any one of Examples 1-11 may optionally include the processor implementing a component of the data link layer and the header including header information of at least one of Internet protocol layer, transport layer and application layer.

In Example 13, the subject-matter of any one of Examples 1-12 may optionally include the media output unit implementing a component of the application layer.

In Example 14, the subject-matter of any one of Examples 1-13 may optionally include the sequence number being an application layer sequence number.

In Example 15, the subject-matter of any one of Examples 1-14 may optionally include the sequence number being real-time data transmission sequence number.

In Example 16, the subject-matter of any one of Examples 1-15 may optionally include the sequence number being a Real-Time Transport Protocol sequence number.

In Example 17, the subject-matter of any one of Examples 1-16 may optionally include the processor implementing a component of the Packet Data Convergence Protocol layer of the mobile communication device.

In Example 18, the subject-matter of any one of Examples 1-17 may optionally include the media payload being encoded and the media output unit comprising a media decoder.

In Example 19, the subject-matter of any one of Examples 1-18 may optionally include the processor being configured to determine a time stamp of the media payload and to forward the media payload, the sequence number and an indication of the time stamp to the media output unit.

In Example 20, the subject-matter of any one of Examples 1-19 may optionally include no decompression of the compressed header occurring comprising the mobile communication device lacking data necessary for decompressing the compressed header.

In Example 21, the subject-matter of any one of Examples 1-20 may optionally include no decompression of the compressed header occurring comprising the mobile communication device having missed a preceding packet of the sequence of packets including data necessary for decompressing the compressed header.

In Example 22, the subject-matter of any one of Examples 1-21 may optionally include the packet having a packet sequence number and the processor being configured to determine the sequence number of the media payload based on the packet sequence number.

In Example 23, the subject-matter of any one of Examples 1-22 may optionally include the processor implementing a component of a communication layer and being configured to forward the media payload and an indication of the sequence number to the media output unit circumventing at least one other communication layer above the communication layer.

In Example 24, the subject-matter of any one of Examples 1-23 may optionally include the processor implementing a component of the data link layer and the at least one other communication layer comprising at least one of Internet protocol layer and transport layer.

Example 25 is a method for receiving data as illustrated in FIG. 12

In Example 26, the subject-matter of Example 25 may optionally include the media payload comprising audio data.

In Example 27, the subject-matter of any one of Examples 25-26 may optionally include the media payload comprising video data.

In Example 28, the subject-matter of any one of Examples 25-27 may optionally include each packet of the sequence of packets having a sequence number and including a compressed header and a media payload.

In Example 29, the subject-matter of any one of Examples 25-28 may optionally include determining the sequence number based on information from a header of a previous packet of the sequence of audio packets.

In Example 30, the subject-matter of any one of Examples 25-29 may optionally include the previous packet being a previous packet of the sequence of audio packets received before the packet whose header was decompressed by the method.

In Example 31, the subject-matter of any one of Examples 25-30 may optionally include storing the sequence number of the previous packet and determining the sequence number of the packet based on the stored sequence number.

In Example 32, the subject-matter of any one of Examples 25 may optionally include reconstructing the header of the packet and forwarding the media payload together with the reconstructed header to the media output unit.

In Example 33, the subject-matter of Example 32 may optionally include the header of the packet including the sequence number.

In Example 34, the subject-matter of any one of Examples 32-33 may optionally include reconstructing the header based on the header of a previous packet of the sequence of audio packets received before the packet whose header was successfully decompressed.

In Example 35, the subject-matter of Example 34 may optionally include a memory configured to store the header of the previous packet of the sequence of audio packets received before the packet whose header was successfully decompressed.

In Example 36, the subject-matter of any one of Examples 25-35 may optionally include the data link layer performs the determining, extracting and forwarding and the header including header information of at least one of Internet protocol layer, transport layer and application layer.

In Example 37, the subject-matter of any one of Examples 25-36 may optionally include the media output unit implementing a component of the application layer.

In Example 38, the subject-matter of any one of Examples 25-37 may optionally include the sequence number being an application layer sequence number.

In Example 39, the subject-matter of any one of Examples 25-38 may optionally include the sequence number being real-time data transmission sequence number.

In Example 40, the subject-matter of any one of Examples 25-39 may optionally include the sequence number being a Real-Time Transport Protocol sequence number.

In Example 41, the subject-matter of any one of Examples 25-40 may optionally include the Packet Data Convergence Protocol layer performing the determining, extracting and forwarding.

In Example 42, the subject-matter of any one of Examples 25-41 may optionally include the media payload being encoded and the media output unit comprising a media decoder.

In Example 43, the subject-matter of any one of Examples 25-42 may optionally include determining a time stamp of the media payload and forwarding the media payload, the sequence number and an indication of the time stamp to the media output unit.

In Example 44, the subject-matter of any one of Examples 25-43 may optionally include no decompression of the compressed header occurring comprising the lack of data necessary for decompressing the compressed header.

In Example 45, the subject-matter of any one of Examples 25-44 may optionally include no decompression of the compressed header occurring comprising having missed a preceding packet of the sequence of packets including data necessary for decompressing the compressed header.

In Example 46, the subject-matter of any one of Examples 25-45 may optionally include the packet having a packet sequence number and the method comprising determining the sequence number of the media payload based on the packet sequence number.

In Example 47, the subject-matter of any one of Examples 25-46 may optionally include a communication layer performing the determining, extracting and forwarding and the method comprising forwarding the media payload and an indication of the sequence number to the media output unit circumventing at least one other communication layer above the communication layer.

In Example 48, the subject-matter of any one of Examples 25-47 may optionally include the data link layer performing the determining, extracting and forwarding and the at least one other communication layer comprising at least one of Internet protocol layer and transport layer.

Example 49 is a computer readable medium having recorded instructions thereon which, when executed by a processor, make the processor perform a method for receiving data according to any one of Examples 25 to 48.

According to a further example, a communication device is provided comprising a media output unit, a receiver configured to receive a packet of a sequence of packets, the packet including a compressed header and media payload and a processor configured to detect whether decompression of the compressed header is prevented, and, if decompression of the compressed header is prevented, to determine a sequence number of the media payload, extract the media payload from the packet and forward the media payload and an indication of the sequence number to the media output unit.

According to a further example, a method for receiving data is provided comprising receiving a packet of a sequence of packets, the packet including a compressed header and media payload, detecting whether decompression of the compressed header is prevented, and, if decompression of the compressed header is prevented, determining a sequence number of the media payload, extract the media payload from the packet and forwarding the media payload and an indication of the sequence number to a media output unit.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. An apparatus adapted for maintaining receiving data quality used in a mobile communication device, the apparatus comprising:
   a media output unit;
   a receiver configured to receive a packet of a sequence of audio packets, the packet comprising a compressed header and media payload; and
   a processor configured to
      determine whether decompression of the compressed header fails; and
      if decompression of the compressed header fails, determine a sequence number of the media payload, extract the media payload from the packet, and forward the media payload and the determined sequence number to the media output unit.

2. The apparatus of claim 1, wherein the media payload comprises audio data.

3. The apparatus of claim 1, wherein the media payload comprises video data.

4. The apparatus of claim 1, wherein each packet of the sequence of packets comprises a sequence number and comprises a compressed header and a media payload.

5. The apparatus of claim 1, wherein the processor is further configured to, if decompression of the compressed header fails, determine the sequence number based on information from a header of a previous packet of the sequence of audio packets.

6. The apparatus of claim 5, wherein the previous packet is a previous packet of the sequence of audio packets received before the packet whose header was decompressed by the mobile communication device.

7. The apparatus of claim 5, comprising a memory configured to store the sequence number of the previous packet and the processor is configured to determine the sequence number of the packet based on the stored sequence number.

8. The apparatus of claim 1, wherein the processor is configured to, if decompression of the compressed header fails, reconstruct the header of the packet and is configured to forward the media payload together with the reconstructed header to the media output unit.

9. The apparatus of claim 8, wherein the header of the packet includes the sequence number.

10. The apparatus of claim 8, wherein the processor is configured to reconstruct the header based on the header of a previous packet of the sequence of audio packets received before the packet whose header was successfully decompressed by the mobile communication device.

11. The apparatus of claim 10, comprising a memory configured to store the header of the previous packet of the sequence of audio packets received before the packet whose header was successfully decompressed by the mobile communication device.

12. The apparatus of claim 1, wherein the processor implements a component of a data link layer and the header includes header information of at least one of Internet protocol layer, transport layer and application layer.

13. The apparatus of claim 1, wherein the media output unit implements a component of an application layer.

14. The apparatus of claim 1, wherein the sequence number is an application layer sequence number.

15. The apparatus of claim 1, wherein the sequence number is real-time data transmission sequence number.

16. The apparatus of claim 1, wherein the sequence number is a Real-Time Transport Protocol sequence number.

17. The apparatus of claim 1, wherein the processor implements a component of a Packet Data Convergence Protocol layer of the mobile communication device.

18. The apparatus of claim 1, wherein the media payload is encoded and the media output unit comprises a media decoder.

19. A method for receiving data used in a mobile communication device, the method comprising:
   receiving a packet of a sequence of packets, the packet comprising a compressed header and media payload;
   determining whether decompression of the compressed header fails; and
   if decompression of the compressed header fails:
      determining a sequence number of the media payload;
      extract the media payload from the packet; and
      forwarding the media payload and the determined sequence number to a media output unit.

20. A non-transitory computer readable medium having recorded instructions thereon which, when executed by a processor, make the processor perform a method for receiving data according to claim 19.

* * * * *